United States Patent [19]

Davis et al.

[11] 3,748,404

[45] July 24, 1973

[54] TELEPHONE LINE CIRCUIT EMBODYING A TRIGGERABLE AVALANCHE DEVICE

[75] Inventors: Gordon H. Davis, Canadaigua; Frank Niertit, Webster; Bernard H. Root, Palmyra, all of N.Y.

[73] Assignee: Strombert-Carlson Corporation, Rochester, N.Y.

[22] Filed: Dec. 28, 1970

[21] Appl. No.: 101,479

[52] U.S. Cl. .................................................. 179/99
[51] Int. Cl. ............................................ H04m 3/22
[58] Field of Search ..................... 179/18 F, 18 FA, 179/99, 81 R

[56] References Cited

UNITED STATES PATENTS

| | | | |
|---|---|---|---|
| 3,647,983 | 3/1972 | Fitzsimons et al. | 179/99 |
| 3,436,488 | 4/1969 | Barbata et al. | 179/99 |
| 3,598,924 | 8/1971 | Zucker | 179/99 |
| 3,420,963 | 1/1969 | Abbott et al. | 179/99 |
| 3,239,610 | 3/1966 | Morse et al. | 179/18 F |
| 3,283,083 | 11/1966 | MacLeod | 179/99 |
| 3,395,256 | 7/1968 | Limiero et al. | 179/99 |

*Primary Examiner*—Kathleen H. Claffy
*Assistant Examiner*—Randall P. Myers
*Attorney*—Charles C. Krawczyk

[57] ABSTRACT

A telephone line circuit for a key telephone system embodying a triggerable avalanche device for placing a telephone line in a hold condition and releasing the line therefrom when a telephone switching system applies a polarity reversal or a line current interruption to the telephone line circuit.

12 Claims, 1 Drawing Figure

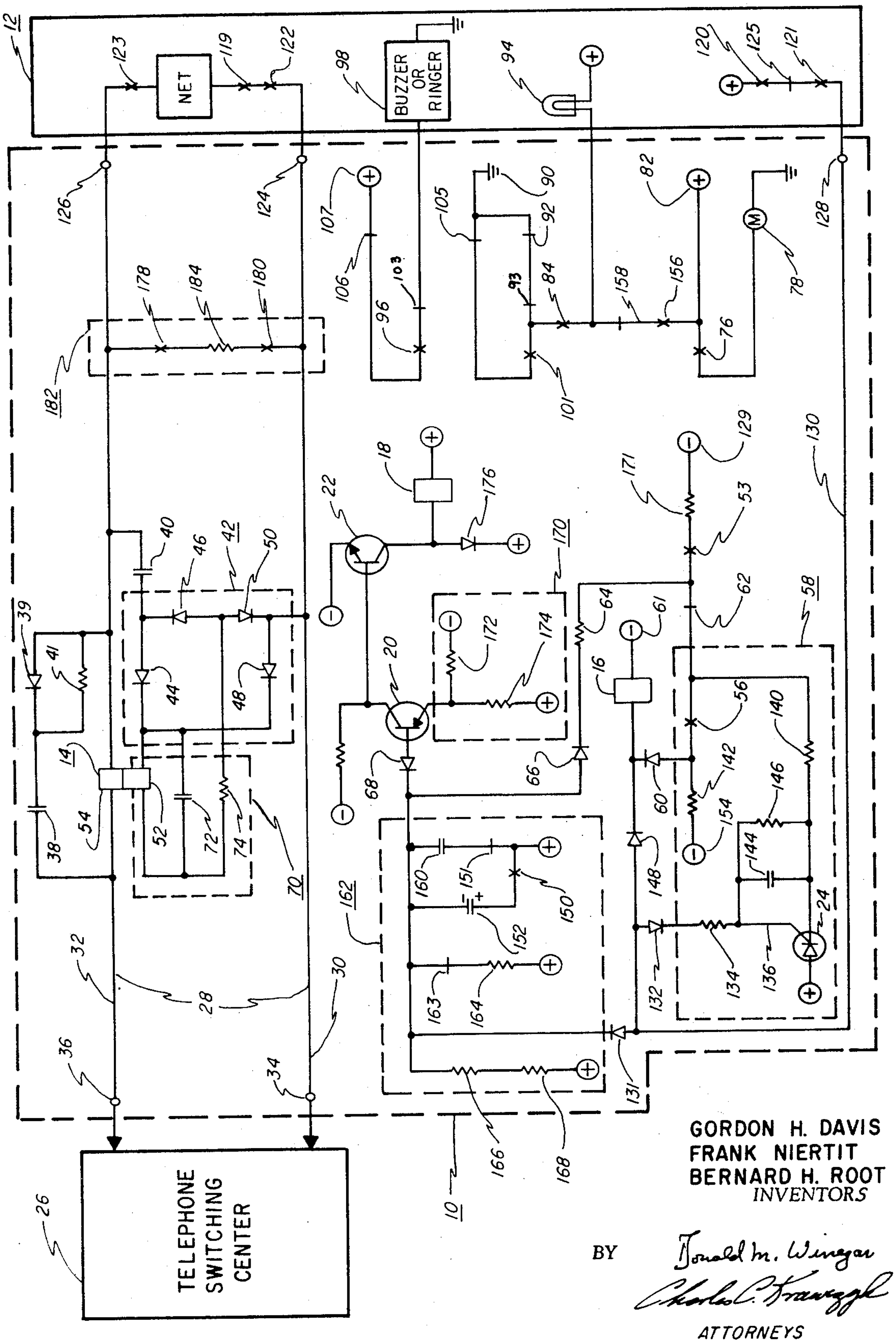
GORDON H. DAVIS
FRANK NIERTIT
BERNARD H. ROOT
INVENTORS
BY Donald M. Winegar
Charles C. Kraszewski
ATTORNEYS

TELEPHONE LINE CIRCUIT EMBODYING A TRIGGERABLE AVALANCHE DEVICE

BACKGROUND OF THE INVENTION

1. Field of the Invention

This invention relates to telephone line circuits in general and more particularly to line circuits for key telephone systems.

2. Description of the Prior Art

A basic part of a telephone network is a telephone line circuit providing the interface between a subscriber's telephone set and the switching equipment in a telephone switching center. This telephone circuit performs the necessary supervisory and control functions that occur or are likely to occur when a connection is made between a telephone switching center and one or more subscriber's telephone sets. One of these functions performed by prior art line circuits relates to the provision for line holding arrangements. In a key telephone system it is sometimes desirable to hold one telephone line, keeping the line in an inactive but a waiting condition, while actually transmitting and receiving on a second telephone line. Means must therefore be provided for the manual release of a line from its hold condition as well as providing means responsive to the telephone switching center that will also release the telephone line in the hold condition.

In the U.S. Pat. No. 3,436,488, Barbato et al., issued Apr. 1, 1969, entitled "Line Circuit For A Key Telephone System Utilizing A Single Multifunction Supervisory Relay", Barbato et al., teaches a key telephone circuit embodying circuit means whereby in the event that a party placed in a hold condition abandons his call by placing his telephone set in the on hook condition, the line circuit can be released from the connecting switching equipment by providing a momentary interruption of the line current or a momentary polarity reversal of the line potential. Unfortunately, it has been found out that this will not always occur. When a party placed in hold condition would hang up before being released from the hold condition, the momentary reversal of the battery source at the switching center has proven to be insufficient on many occasions to release the telephone line from the hold condition. As a consequence, the telephone line is held in an undesirable busy condition.

Additionally, it has been found that the telephone line circuit taught by Barbato et al. is subject to false operation of the transistorized circuit portion as a result of transient currents induced into the circuit by various means. This undesirable feature of the Barbato et al., teaching results from the transistorized circuit being connected directly to the tip and the ring lines of the telephone circuit.

An improvement upon the Barbato et al., teaching is a telephone line circuit which provides a means for isolating a control circuit from the tip and the ring lines of a telephone line circuit through use of a relay. However, it has been found that this arrangement still does not provide a positive means of releasing the telephone line from a hold condition when the outside party placed in a hold condition goes back on hook before being released from the hold condition. As a result, the seized telephone line still remains in an undesirable busy condition.

An object of this invention is to provide a new and improved telephone line circuit having a telephone line circuit including an avalanche device electrically isolated from the telephone line and which is responsive to a key telephone set to place a seized telephone line in a hold condition and immediately releases the seized line in response to a change in potential across the line, such as a reversal of polarity, or a momentary interruption of the telephone line.

SUMMARY OF THE INVENTION

In accordance with the teachings of this invention, there is provided a telephone line circuit for a key telephone system comprising a pair of line conductors. Relay means are provided for connecting a dummy load across the line conductors for placing the line in a hold condition. Circuit means including a triggerable avalanche device is connected to the relay means for actuating the relay circuit means to place the line in a hold condition wherein the circuit means is responsive to a change in potential across the line, such as a momentary interruption of the line or a reversal of polarity of potential across the conductors to deactivate the relay means and release the line from the hold condition. A first electrical circuit means comprises a second relay in a series electrical circuit relationship with a third relay for placing said pair of line conductors in a hold condition. A second electrical circuit means, physically isolated from said pair of line conductors, comprises, in part, the triggerable avalanche device positively responsive to a polarity reversal applied to the pair of line conductors to cause the second and the third relays in said first electrical circuit means to release the pair of line conductors from the hold condition.

BRIEF DESCRIPTION OF THE DRAWING

The single FIGURE is an electrical schematic of a telephone line circuit for a key telephone system embodying the control circuit and triggerable avalanche device including the invention.

DESCRIPTION OF THE PREFERRED EMBODIMENT

The FIGURE includes a schematic of a single line circuit of a key telephone system 10 adapted to be connected to any one of a plurality of key telephone sets 12 (only one shown) for connecting any one of the telephone sets to a telephone line, and for subsequently placing the telephone line in a hold condition keeping the line in an inactive but a waiting condition, while the same telephone set 12 is connected to another telephone line.

When the line circuit 10 is in an idle circuit condition, the relays 14, 16 and 18 are in a deactivated condition, the transistors 20 and 22 are non-conducting, and a triggerable avalanche device 24, such as for example, a controlled rectifier, is in a non-conducting state.

When a party connected to a telephone switching center 26 seizes a telephone line 28 by connecting the respective tip 30 and ring 32 line terminals 34 and 36 to the remote or calling party's telephone line (not shown) by means of the switching equipment of the center 26, a ringing signal is applied across the pair of line conductors 30 and 32 of the telephone line 28 with the tip line 30 grounded. The ringing signal applied to the line 28 is an interrupted a.c. voltage superimposed on a direct current battery potential. The ringing signal is coupled through a capacitor 38, a diode 39 in a parallel circuit arrangement with a resistor 41, a capacitor 40 and also through a coil 54 of the relay 14 to a bridge rectifier circuit 42. However, the relay 14 is not picked up by the ringing signals through the coil 54 of the relay 14. The ringing signal is rectified by the bridge rectifier 42 comprising diodes 44, 46, 48 and 50 to provide d.c. current which is filtered by a filtering circuit 70 comprising a capacitor 72 and a resistor 74, and energizes a coil 52 of the relay 14 to pick up the relay.

When relay 14 picks up, the contacts 56 located in a control circuit 58 close. This completes a path between a negative power supply terminal 61 and the base of the transistor 20 through a diode 60, the normally closed contacts 62 of the relay 16, a resistor 64 and diodes 66 and 68, to render the transistor 20 conductive. The transistor 20 is back biased by a circuit 170 comprising resistors 172 and 174. A diode 176 prevents high inductive voltages from the relay 18 coil from damaging the transistor 22. The impedance of the path limits the current to a value below the operating current value of the relay 16. The transistor 20, when conductive, applies a positive drive to the base of transistor 22, which, in turn, renders the transistor 22 conductive to energize the relay 18 to pick up the relay 18.

When the relay 18 picks up, it completes the circuit to various components of the system, depending upon the system signalling options. The closing of the contacts 76 of the relay 18 completes a circuit between an interrupter motor 78 and a power supply terminal 82. The closing of the contacts 84 of the relay 18 connects a power source terminal 90 through a slow interrupter contact 92 to cause a line lamp 94 of the telephone set 12 to flash periodically at a low rate. Picking up of the relay 18 also provides an interrupted ringing current to the telephone set 12 by closing the contacts 96 and connecting a buzzer, or ringer 98 through the contacts 103 of relay 16, and the interrupter contacts 106 to a power supply terminal 107 to provide an audible interrupted ringing signal from an incoming call. The transistors 20 and 22 remain conductive and the relays 14 and 18 are picked up until the telephone set 12 goes "off hook", or until the calling party hangs up.

OUTSIDE CALLING PARTY GOES "ON HOOK" BEFORE INSIDE CALLED PARTY GOES "OFF HOOK"

If after a sufficient time, for one reason or another, the calling party decides to hang up prior to the telephone set 12 going off hook, the ringing signals stop and the coil 52 of the relay 14 is no longer energized and the relay 14 drops out. The contacts 56 of the relay 14 open to remove the negative drive on the transistor 20. However, during the ringing, while the contacts 56 of the relay 14 are closed, a capacitor 160 is charged. The capacitor 160, along with resistors 164, 166 and 168 comprise in part an integrator circuit 162 which is designed to prevent the effect of line noise and transient currents from triggering transistor 20, thereby causing false operation of the circuit. When the relay 18 picks up, the contacts 163 open and remove the resistor 164 from the circuit, thereby increasing the discharge time of the circuit. The integrator circuit 162 provides a built in delay of a suitable period of time such, for example, as normally a 400 millisecond delay, to prevent false operation.

Upon opening of the contacts 56 of the relay 14, the capacitor 160 begins to discharge through the resistors 166 and 168 and allows the relay 18 to be continuously energized during ringing without applying a continuous ringing signal to the circuit 12. Suitably steady ringing circuit operation periods may be for such periods of time as 10, 20 or 30 seconds, depending upon one's design requirements.

When the capacitor 160 has been discharged sufficiently, the voltage in the circuit reaches a value insufficient to maintain the forward bias on the transistor 20, and the transistor 20 turns off. The turning off of the transistor 20 turns off the transistor 22 and, in turn, de-energizes the relay 18. When the relay 18 is deactivated, the contacts 76, 84 and 96 of the relay 18 are opened, thereby breaking the circuitry between the power supply terminal 82, and the lamp 94 and the buzzer or ringer 98 and the power supply terminal 107, and discontinuing the operations thereof, and both the line circuit 10 and the telephone set 12 have now been returned to an idle condition.

CALLED PARTY GOES OFF HOOK WHILE CALLING PARTY ON LINE

To answer the incoming signals, the handset of the telephone set 12 is removed to the off hook condition which closes the hookswitch contacts 119 and 120, and the operation of a first line selector key such, for example, as by depressing thereof, closes the contacts 121, 122 and 123. Contacts 119, 122 and 123 connect the telephone set 12 to the line circuit 28 and completes the connection between the tip 30 and the ring 32 lines and the telephone network. The ringing signals are stopped, but the relay 14 remains picked up by a current flow through coil 54. The contacts 120 and 121 complete a control signal connection to the line card via hold key contacts 125. The line circuit then functions to complete a telephone connection between the two parties for receiving and transmitting telephone communication. A positive potential is passed through the contacts 120, 121 and 125 and is impressed through an input terminal 128 through a lead 130 to the control circuit 58. The positive potential energizes the relay 16 through a diode 148 and the relay 16 picks up. The positive potential also passes through a diode 132 and a resistor 134, to a gate lead 136 to trigger or turn "on" the triggerable avalanche device 24. A suitable triggerable avalanche device 24 is such, for example, a silicon controlled rectifier. A parallel circuit including a capacitor 144 and a resistor 146 is employed as a filtering network. The device 24 conducts through the resistors 140 and 142 and the contacts 56 of the relay 14 to the negative terminal 154 providing a "latched" control circuit, which is conductive but in an on idle state.

The positive potential on the lead 130 is transmitted through a diode 131 to cut off the transistor 20 which, in turn, cuts off the transistor 22 and de-energizes the relay 18 and the relay 18 drops out. The contacts 96 of the relay 18 open and the audible signal of the buzzer and ringer 98 is discontinued. The contacts 84 of the relay 28 open to remove the line lamp 94 from connection with the contacts 92 of the slow interrupter, and the lamp 94 is energized to a steady state through the contacts 156 of the relay 16 which connects the lamp 94 to the power supply terminal 82 through the lead 158. Connections are now complete for telephone communication between the calling party through the telephone switching center 26 and the called party operating the telephone set 12 and battery potential from the completed circuit is supplied by the telephone switching center 26.

The contacts 150 of the relay 16 close and the contacts 151 open connecting the capacitor 152 in the integrator circuit 162 and disconnecting the capacitor 160, thereby reducing the time constant of the circuit.

HOLD CONDITION

It is sometimes necessary to place the outside party in a hold condition on the line 28 while being connected to a second telephone line. To accomplish this end, the person using the telephone set 12 operates a hold key and then subsequently operates a second line selector key. Operating the hold key opens the contacts 125 and removes the positive potential applied to the lead 130 through the input terminal 128. As a consequence, the positive potential on the line 130 is removed from the relay 16. Relay 16 does not drop out, however, since the triggerable avalanche device 24, which had been turned on when the telephone set 12 went into the off hook condition and has since been in an on idle state, now conducts through the diode 60 to maintain the relay 16 operative.

With the positive potential removed from the line 130, a negative potential from a power terminal 129 is applied through a resistor 171, the contacts 53 of the relay 16, resistor 64 and diodes 66 and 68 to turn the transistors 20 and 22 on and causing the relay 18 to pick up. With both of the relays 16 and 18 picked up, the contacts 178 of the relay 16 and the contacts 180 of the relay 18 close connecting a dummy loading circuit 182 across the lines 30 and 32. The dummy loading circuit 182 comprises a resistor 184 which imparts a load across the tip 30 and the ring 32 lines, replacing the electrical loading of the circuit imposed initially by the telephone set 12. The net effect is that the switching equipment of the telephone switching center 26 still sees the equivalent loading of the telephone line 28 and the line 28 is retained seized by the center 26. The outside party is now placed in a hold condition with the line 28 seized and in a waiting reconnection to the telephone set 12.

Both of the relays 16 and 18 are picked up and therefore the interrupter motor 78 is connected through the closed contacts 76 of the relay 18 to the power supply terminal 82 and is operable. The line lamp 94 is now connected to the power supply terminal 90 through the fast interrupter contacts 105, contacts 101 of the relay 16 and contacts 84 of the relay 18 providing a rapid flashing signal.

OUTSIDE PARTY IN HOLD POSITION GOES ON HOOK CONDITION BEFORE BEING RELEASED FROM HOLD CONDITION

If the outside party placed in a hold condition decides to abandon his call, he will hang up his telephone. Within the telephone switching center 26, a momentary battery reversal or open circuit occurs within the switching equipment. This momentary battery reversal or open circuit is of a sufficient time duration (such as, for example, in the order of 0.8 millisecond), to release the relay 14, and momentarily break the contacts 56 of the relay 14 in the control circuit 58. The breaking of the contacts 56 opens the latching current circuit of the triggerable avalanche device 24, and the device 24 is turned off. The turning off of the device 24 drops out the relay 16, which, in turn, opens the contacts 53 and removes the forward bias on the transistor 20 and, thereby, drops out the relay 18. Therefore, since both of the contacts 178 and 180 of the relays 16 and 18, respectively, are opened in the dummy loading circuit 182, the telephone line 28 is released back to an idle condition waiting to be seized again by the center 26. In addition, the contacts 156 of the relay 16 are opened and the line lamp 94 is cut off.

The embodiment of the triggerable avalanche device 24 in control circuit 58 therefore provides a positive release of the seized telephone line 28 in response to a momentary open circuit or a battery reversal from the center 26 indicating that a party in the hold condition calling in through the center 26 has reverted back to an on hook condition before being released from the hold condition. This positive release of the telephone line 28 upon occurrence of the momentary battery reversal or momentary open circuit in the center 26 is accomplished by the rapid response of the latching circuit including the device 24 in the control circuit 58. The terminology "positive release" means that when the telephone switching center 26 or the telephone set 12 signals for the release of the telephone line 28 from a hold condition and this relay 14 momentarily opens the control circuit 58 instantaneously responds by shutting off the triggerable avalanche device 24, thereby releasing the hold line 28. This responsive reaction by the control circuit 58 assures one of absolute certainty that the hold line 28 will be released immediately from the hold condition in response to the signal of either the center 26 or the set 12. One is assured, therefore, that the line 28 will not be inadvertently left in an undesirable busy condition when the party calling through the center 26 has placed his telephone on hook before being released from the hold condition.

The triggerable avalanche device 24 of the control circuit 58 therefore cures the undesirable effects of the Barbato et al. circuit which failed to provide a positive release of the seized telephone line each time an outside party through center 26 placed in a hold condition reverted back to an on hook condition before being released from the hold condition.

An additional advantage is the physical isolation of control circuit 58 from line 28 wherein the occurrence of any transient currents or voltages in line 28 will not cause any false or pre-mature operation of circuit 58 or any of its associated electrical circuitry electrically connected thereto. In particular, the integrator circuit 162, which in itself is a protection circuit to protect the circuitry from noise and transients on the telephone line 28, is also physically isolated from the line 28 and therefore is not subject to false operation resulting from noise and transients in line 28.

Although the device 24 has been shown in a circuit which turns it off by opening the current path of device 24, one is able to employ the device 24 in circuits which reduce the anode current below the holding current of the device, or reverse bias the device.

CALLED PARTY RETRIEVES OUTSIDE PARTY IN HOLD POSITION

In retrieving the calling outside party from a hold position, the called party of the telephone set 12 operates the first line selector key again, thereby closing the contacts 121, 122 and 123 of the second line selector key simultaneously, and releases the hold button closing contacts 125. The telephone line 28, in a hold position, is now reconnected to the telephone set 12 through the hookswitch contacts 119 and the first selector line key contacts 122 and 123 and terminals 124 and 126 of the line 28. In the same manner as described heretofore in 'The Called Party Goes off Hook while Calling Party on Line', a positive potential is again impressed on the input terminal 128 of the lead 130 as both the contacts 120 of the hookswitch and the contacts 121 of the first line selector and hold key 125 are now closed. This positive potential reverse biases the transistor 20 and the relay 18 dropped out. The positive potential now energizes the relay 16 and the latching current circuit is now in an on or idling condition. The triggerable avalanche device 24 is still on, and electrical current is still flowing in the latching circuit, and it is not this current but the positive potential impressed through terminal 128 which keeps relay 16 operative. The interrupter motor 78 is turned off and line lamp 94 is continuously lighted. The relay 18 having dropped out opens the contacts 180 removing the dummy loading circuit 182 from across the telephone line 28 and telephone communication between the calling party and the called party of the telephone set 12 is restored.

What is claimed is:

1. A telephone line circuit for serving key telephones in a key telephone system comprising a pair of line conductors, relay circuit means for detecting current therethrough and for connecting a dummy load across the line conductors for placing said line in a hold condition, and circuit means including a triggerable avalanche device for causing said relay circuit means to place said line in a hold condition in response to a hold signal from a key telephone and for causing said relay circuit means to positively release said line from the hold condition upon detection by said relay circuit means of a momentary interruption of line current or polarity reversal in line potential.

2. A telephone line circuit as defined in claim 1 wherein said relay circuit means is responsive to the conduction of the triggerable avalanche device to place the line in hold and said circuit means renders said device non-conductive to cause the relay means to release the line from hold in response to the momentary line current interruption or line potential polarity reversal.

3. A telephone line circuit as defined in claim 2 wherein said relay circuit means includes a relay connected in series with said pair of line conductors and said device is connected in series with contacts of said relay whereby said device is rendered conductive when said relay is actuated and said hold signal is present and is rendered non-conductive when said relay is momentarily deactuated.

4. A key telephone line circuit for connecting a key telephone set to a telephone line from a switching exchange comprising:

a key telephone set including at least one line key, at least one hold key and signalling means;

first, second and third relays;

a triggerable avalanche semiconductor device;

a pair of line conductors for connecting the telephone line to the key telephone set through contacts of said line key;

circuit means connecting said first relay to said pair of conductors so that said first relay is energized by either ringing signals or by a D.C. current flow through the telephone line;

circuit means connected so that said second relay is energized through contacts of said first relay when said first relay is actuated by ringing signals wherein contacts of said second relay are actuated to activate said signalling means;

circuit means responsive to when said telephone set goes off hook and the line key is actuated for actuating said third relay and deactuating said second relay;

a dummy load for connection across said pair of conductors through contacts of said second and third relays, and circuit means responsive to the actuation of the hold key for actuating said third relay through said device and for actuating said second relay thereby connecting said dummy load across said pair of conductors to place the line in a hold condition and wherein a momentary polarity reversal in potential across said conductors or interruption in line current sufficient to momentarily drop out the first relay cuts off the triggerable avalanche device and deactivates the second and third relays.

5. A key telephone line circuit for connecting a key telephone set to a telephone line from a telephone switching exchange comprising:

a pair of line conductors for connecting the telephone line from the exchange to said telephone set for transmitting voice signals;

a first relay circuit connected to said pair of line conductors for energization by either ringing signals from said exchange or by a D.C. current flow through the telephone line;

a second relay circuit responsive to the actuation of said first relay for applying ringing signals to said telephone;

a third relay circuit including a triggerable avalanche device for actuation in response to an off hook condition in said telephone set;

a dummy load circuit for connection across said line conductors through contacts of said second and third relay circuits, and circuit means responsive to the operation of the hold button in said telephone set for maintaining said third relay circuit actuated through said triggerable avalanche device and for actuating said second relay circuit means whereby said dummy load is connected across said pair of conductors, the arrangement being such that the triggerable avalanche device is responsive to a momentary deactuation of said first relay circuit to deactivate said second and third relay circuits and release said dummy load.

6. A telephone line circuit for placing a telephone line serving a key telephone in and out of hold conditions comprising:

a monitor circuit including a monitor relay which is energized by d.c. current flow in the telephone lines;

circuit means including a triggerable avalanche device and a first hold relay arranged so that in response to a hold signal from the key telephone said first hold relay is energized through a series path including said device and a contact of said monitor relay;

circuit means for applying a gating signal to turn on said device prior to a hold condition and for removing said gating signal after the initiation of the hold condition;

a second hold relay;

circuit means for energizing said second hold relay through contacts of said first hold relay in response to said hold signal;

a dummy load, and circuit means including contacts of said first and second hold relays for connecting said dummy load across the telephone line when both said first and second hold relays are energized.

7. The line circuit of claim 6 wherein said monitor relay is energized by ringing signals and said second hold relay is energized through a contact of said monitor relay in response to the ringing signals.

8. The line circuit of claim 7 wherein said second hold relay is de-energized by an off hook signal generated in the key telephone when a telephone call is answered.

9. The line circuit of claim 6 wherein said first hold relay is energized by an off hook signal generated in the key telephone whenever a talking path through the telephone line is completed via the telephone.

10. A control circuit for providing a positive release of a telephone line while on hold, the telephone line being connected to a key telephone set through a line circuit having a line relay which is actuated by current through the telephone line and a first relay which is actuated for connecting a dummy load across the telephone line in response to a hold signal from the telephone set to effectuate a hold condition, said control circuit comprising:

a triggerable avalanche device;

circuit means for providing a first current path to said avalanche device;

circuit means for applying a gating signal to said avalanche device to render it conductive through said first current path when the telephone set is connected to the telephone line and for removing the gating signal in response to the hold signal, and circuit means for energizing the first relay through said avalanche device and contacts of the line relay during a hold condition.

11. The control circuit of claim 10 wherein the line circuit includes a second relay which is energized in response to said hold signal through contacts of the first relay and both the first and second relays are energized to connect the dummy load across the telephone line during a hold condition.

12. The control circuit of claim 11 wherein the first relay is operated whenever the key telephone set is connected to the telephone line and the second relay is operated whenever a ringing signal is applied to the telephone line.

* * * * *